United States Patent
Laberteaux et al.

(10) Patent No.: US 7,734,803 B2
(45) Date of Patent: Jun. 8, 2010

(54) SYSTEM AND METHOD FOR SUBSCRIPTION-BASED CONTENT DISTRIBUTION TO VEHICLES VIA WIRELESS COMMUNICATION

(75) Inventors: Kenneth P. Laberteaux, Ann Arbor, MI (US); Dmitri A. Dolgov, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 761 days.

(21) Appl. No.: 11/430,114

(22) Filed: May 8, 2006

(65) Prior Publication Data

US 2006/0259580 A1 Nov. 16, 2006

Related U.S. Application Data

(60) Provisional application No. 60/678,863, filed on May 6, 2005.

(51) Int. Cl.
*G06F 15/16* (2006.01)
(52) U.S. Cl. ..................... 709/231; 709/218
(58) Field of Classification Search ............... 709/231, 709/218
See application file for complete search history.

(56) References Cited

U.S. PATENT DOCUMENTS

| | | | |
|---|---|---|---|
| 6,047,327 A * | 4/2000 | Tso et al. ............... 709/217 |
| 6,799,201 B1 | 9/2004 | Lee et al. ............... 709/217 |
| 7,010,583 B1 | 3/2006 | Aizono et al. | |
| 7,203,751 B2 | 4/2007 | Yasushi et al. | |
| 2003/0060190 A1 | 3/2003 | Mallart | |
| 2004/0042432 A1* | 3/2004 | Riazi et al. ............ 370/338 |
| 2004/0059498 A1* | 3/2004 | Chinomi et al. ........ 701/200 |
| 2004/0117442 A1* | 6/2004 | Thielen ............... 709/203 |
| 2004/0203892 A1* | 10/2004 | Cole et al. ............ 455/456.1 |
| 2005/0177851 A1 | 8/2005 | Murao et al. | |
| 2005/0283284 A1* | 12/2005 | Grenier et al. ........ 701/29 |
| 2006/0062202 A1* | 3/2006 | Oesterling et al. ....... 370/352 |

FOREIGN PATENT DOCUMENTS

JP 2003244769 A2 8/2003
WO WO 0122712 A1 3/2001

* cited by examiner

*Primary Examiner*—Patrice Winder
(74) *Attorney, Agent, or Firm*—Gifford, Krass, Sprinkle, Anderson & Citkowski, P.C.

(57) ABSTRACT

Methods and systems are described for delivering content to a vehicle occupant through a wireless communications link between a wireless client associated with the vehicle and a wireless access point external to the vehicle. The wireless access point is in communication with a content supplier, and available content from the content supplier, as determined from a user subscription, is delivered to the user using the wireless communications link when the vehicle is stationary.

8 Claims, 3 Drawing Sheets

SYSTEM AND METHOD FOR SUBSCRIPTION-BASED CONTENT DISTRIBUTION TO VEHICLES VIA WIRELESS COMMUNICATION

REFERENCE TO RELATED APPLICATION

This application claims priority from U.S. Provisional Patent Application Ser. No. 60/678,863, filed May 6, 2005, the entire content of which is incorporated herein by reference.

BACKGROUND OF THE INVENTION

Information requirements of vehicle occupants include safety information such as travel conditions in the case of the vehicle operator, and entertainment in the case of vehicle occupants, particularly for passengers. However, existing approaches may not work well for content delivery to the vehicles. For example, the content may not be related to the preferences of the user, selection of content may be difficult, and bandwidth limitations may make immediate delivery difficult.

SUMMARY OF THE INVENTION

Systems and methods according to embodiments of the present invention allow delivery of content (such as video and/or audio information) to a vehicle occupant. A method of delivering content to a vehicle occupant comprises establishing a wireless communications link between a wireless client associated with the vehicle and a wireless access point external to the vehicle. The wireless access point may be a wireless network associated with a home or business, a roadside basestation, and the like. The wireless access point is in communication with a content supplier, and available content from the content supplier, for the user subscription, is delivered to the user using the wireless communications link The delivered content may include audio content (such as music, news, commentary, or other audio information), video content (such as movies, visual representations of road conditions, and/or safety content. Safety content may include data related to traffic conditions, proximity of emergency weather data, and the like.

A summary of available content, such as a list of movies, songs, or other selectable content items, may be presented to the user, and the user selects the content desired. The summary may be based on the subscription type, subscription preferences associated with the subscription, or on some other basis. The user may select immediate or delayed delivery for the content. For example, a large content file may be delivered at a later time, for example when the vehicle is proximate to another wireless access point allowing a higher bandwidth link, or at a time when the vehicle is stationary, so that a single (or reduced number) of wireless access points are used for content delivery, or when the vehicle is not occupied. For example, a movie may be delivered to a vehicle system while the vehicle is parked, for example overnight at the user's home or a hotel. The movie is then immediately available to the user when the user next enters the vehicle.

A configuration server external to the vehicle may be used to handle the subscription information. For example, the configuration server may receive subscription information from the wireless access point, obtain content from the content provider based on the subscription information, and allow wireless transmission of the content to the wireless client associated with the vehicle. The subscription information may be received from the wireless client. Alternatively, identification information from the vehicle may be associated with subscription information using a database external to the vehicle, for example as part of the configuration server. The identification information may be transmitted at intervals by the wireless client, until a wireless communications link is established with the wireless access point. The configuration server may be in communication with one or more content providers over a communications network. For example, the content provider may be a webcasting site accessed over the Internet. The content provider may also be a local content supplier, which may be another device used by the user to store content, or other supplier of local content such as a roadside sensor array. The configuration server may handle subscription information from a plurality of users.

An example system for delivery of content to a user within a vehicle having a subscription to the content comprises a vehicle system (associated and moving with the vehicle), and an external system (external to the vehicle). A vehicle system may comprise a wireless client, a content server, a data storage device, and an input-output system. The external system may comprise a wireless access point, a configuration server, in communication with the wireless access point, and one or more content providers in communication with the configuration server. When a wireless communication link is established between the wireless client and the wireless access point, the configuration server retrieves content from the content provider based on the subscription of the user. The content is then wirelessly transmitted to the wireless client and displayed to the user through an input-output system. The content may include a summary of available further content, such as a selectable list. The input-output system allows the user to select further content from the summary of available further content, and also to select delayed delivery of the further content.

The input-output system may comprise an audio system, such as a vehicle radio or other in-vehicle entertainment device, and a user input device through which the user may select content. The user input device may comprise a touchscreen display, one or more buttons (such as keys), other touch inputs, voice recognition input, or other input mechanisms and combinations thereof.

Embodiments of the system allow automatic batch uploading of content to a vehicle, based on the user's preferences. The preferences may be part of subscription information, or otherwise obtained or determined for the user. When the vehicle is located near a wireless access point so that a wireless communications link can be established, the system checks for available content for delivery to the user, such as new content consistent with the user's subscription(s).

DETAILED DESCRIPTION OF THE INVENTION

Figure 1:
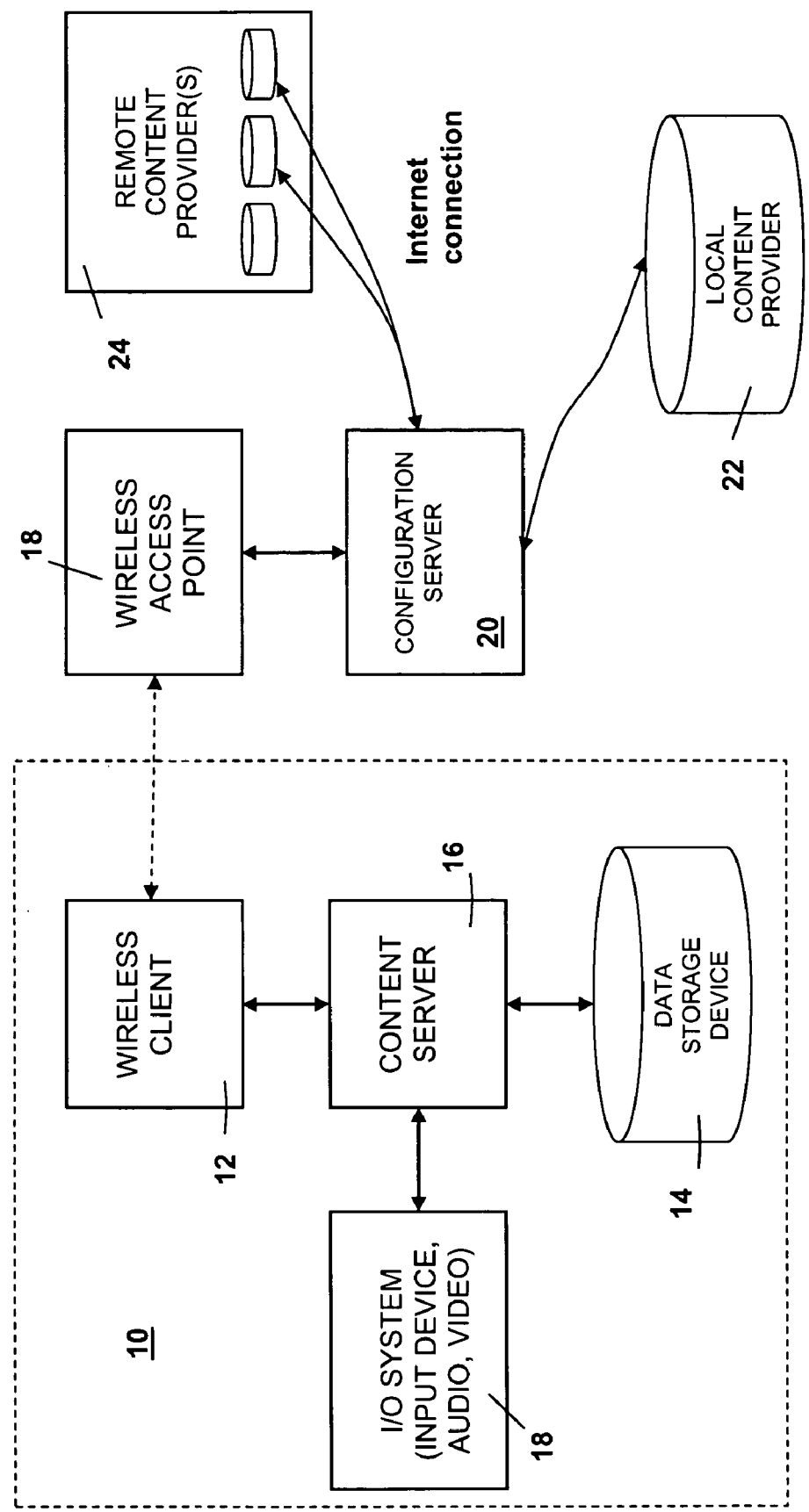
FIG. 1 shows a possible architecture for a content distribution system according to an embodiment of the present invention.

Embodiments of the present invention include a content distribution system that can provide content to vehicle occupants, such as automobile drivers and passengers. The content that can be distributed via the proposed system may include, but is not limited to the following: audio information such as music, radio shows, audio books, and the like; video information such as news, TV, movies, and the like; and data such as traffic conditions, weather reports, sports news, stock market reports, and the like.

A system for automated content delivery to vehicles according to examples of the present invention allows content to be delivered to a user (a vehicle occupant) using wireless communications. The user may select a subscription category and the content (or notification thereof) can be automatically delivered whenever it becomes available. Content transfer to the vehicle can be seamlessly resumed if interrupted for any reason and at any time.

In some embodiments, the system provides automatic batch uploading of content (movies, radio shows, etc.) to a vehicle. The content may be based on the subscriber preferences, which may be known through subscriptions to one or more content providers. Subscriber preferences may also be determined from system usage history, for example from previous user inputs relating to content choice.

Embodiments of the present invention may use the Dedicated Short Range Communications (DSRC), which is 75 MHz of spectrum in the 5.9 GHz band allocated for to enhance the safety and productivity of the nation's transportation system. DSRC regulations permit both safety and non-safety/commercial applications, provided safety messages are accorded priority. Examples of the present invention include a system for distributing commercial content to vehicles using wireless communication, and hence, DSRC may be used in a content distribution system according to the present invention. The wireless client located within the vehicle may be capable of wireless communication using one or more wireless communication protocols, such as DSRC, cellular communication, and the like. Non-safety content may be delivered during intervals in safety-related content delivery.

Whenever a vehicle capable of wireless communication is located near a wireless access point, the system checks the active user's subscription for available content, such as new content that has not been previously delivered to the user. If new content is available, it is delivered to the user by wireless upload to the vehicle system. The wireless access point may be at the user's residence, the user's work location, a business location (such as a gas station or restaurant), a roadside wireless access point, or some other wireless access point.

Delivery of content to a moving vehicle is possible using one or more wireless communication links, and a number of wireless access points may be needed to cover the path of the vehicle. In a preferred embodiment, delivery of non-safety-related content, such as audio and/or video entertainment content, can be delivered while the vehicle is parked. Delivery may be automatic, based on subscription information including subscription preferences. Delivery may also be based on previous selections, and these previous selections can be made either when the vehicle is moving or stopped. Selections for later delivery of content requires exchange of substantially less information than delivery of an entire movie or other video content, and such selections may be made over dedicated short range communications, for example using roadside wireless access points. Content in summary form, such as a menu of selection options, is delivered to the vehicle system, and menu selection information is then transferred to the external system. The timing of delivery of content corresponding to the menu selection can be controlled by user preferences, other subscription information, the size of the content (larger items of content may be delayed), present vehicle location in relation to wireless access points, and probable future vehicle location. For example, content may be delivered at night if the vehicle is located near a wireless access point at the user's home.

FIG. 1 shows a possible high-level architecture of a content distribution system according to an embodiment of the present invention. The vehicle system 10 includes a wireless client 12, a data storage device 14, a content server 16, and an input/output system 18.

The wireless client 12 provides wireless communication with an external wireless access point and may be, for example, a DSRC radio. The data storage device 14 stores content that has been uploaded to the vehicle, and may comprise any type of memory device.

The content server 16 manages content that has been delivered to the vehicle. The content server may comprise a microprocessor or other electronic circuit.

The input/output system 18 comprises a user input device and the audio/video systems in the car. User inputs are received from a vehicle occupant (the user), and may include button or touch-screen presses, voice inputs, eye motion control inputs, and the like. A user input device may comprise a touch-pad screen, buttons, or a combination of these or other devices. The input/output system also includes one or more in-vehicle entertainment devices, such as an audio system and/or video system.

In this example, the content distribution system includes the following components and infrastructure outside of the vehicle: a wireless access point 18, a configuration server 20, a local content provider 22, and one or more remote content providers 24.

The wireless access point (AP) 18 is used to communicate with the wireless client 12 in the vehicle. The content distribution system can exploit existing (and constantly evolving) wireless infrastructure. The wireless access point is optionally connected to the Internet for accessing remote content. An intranet connection is sufficient for delivering content from the local content provider. The wireless access point may a wireless router such as those presently used by many businesses and homes.

The configuration server 20 is used by the system user to specify and manage subscriptions. The configuration server can be used for interfacing with a remote content provider and downloading new content, for example content that matches the user's subscription. A single configuration server can be used to manage multiple vehicles and users.

The local content provider 22 can provide a collection of local content, such as local weather conditions, traffic data, or similar data provided by local sensors, and may also be an electronic device on which user files are stored. For example, the local content provider may be a computer or other electronic device belonging to the user that stores music and video.

Remote content providers 24 function in a similar manner to the local content provider, and may be accessed via the Internet or other communications network. Remote content providers globally provide content to many users. Possible examples include online news services, radio and TV broadcasting corporations, music and video distributors, Internet broadcasters, and the like. A global content provider may be a web server configured to provide subscription content.

Figure 2:
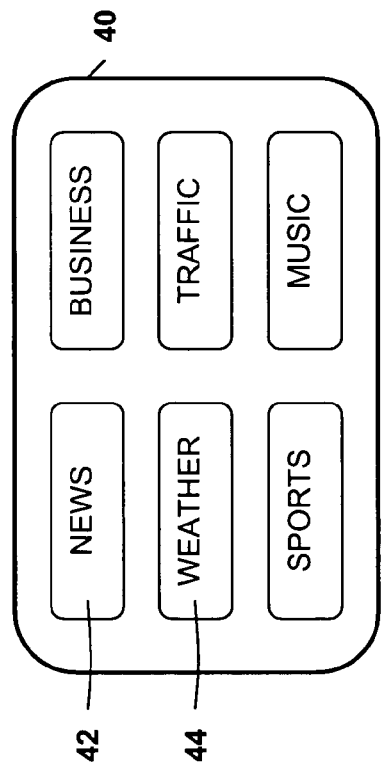
FIG. 2 shows an example of a user display.

FIG. 2 shows an example of the main display 40 of an in-vehicle interface. The screen lists the main categories of user's subscriptions, such as news 42 and weather 44. Content categories may include news, weather, sports, business news, local traffic updates, music, movies, and the like.

Figure 3A:
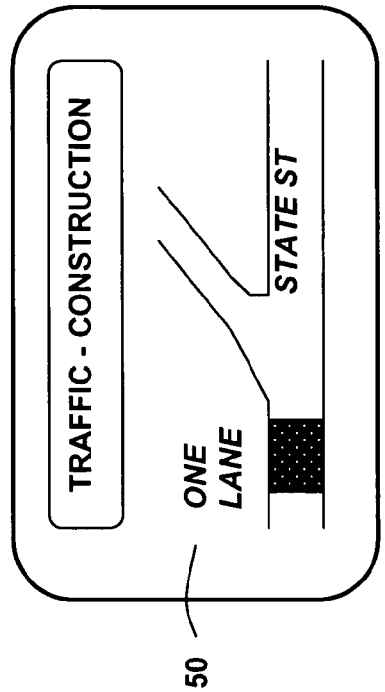
FIGS. 3A AND 3B show further applications of a content distribution system according to embodiments of the present invention.
Figure 3B:
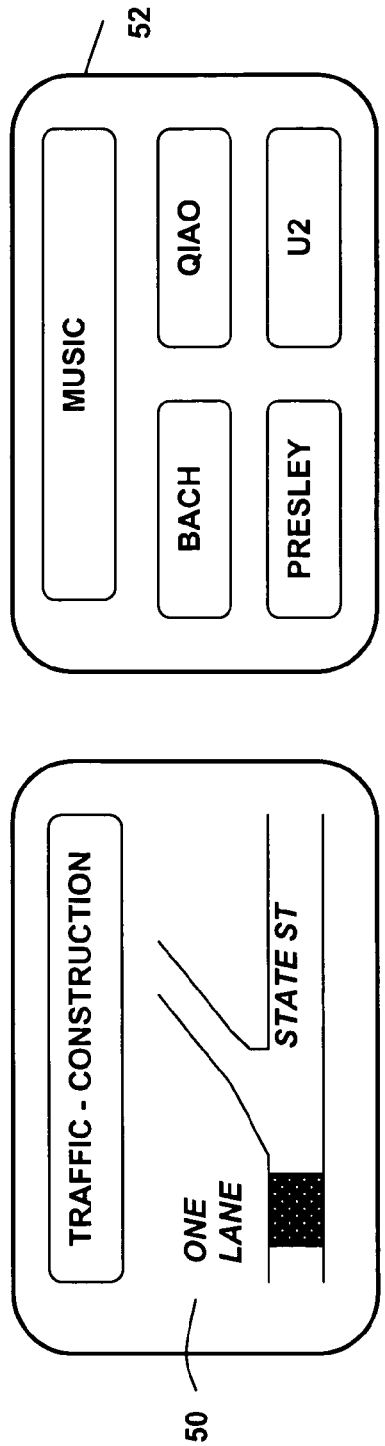

FIGS. 3A and 3B illustrate other possible uses of the system. FIG. 3A shows a content item displayed in the form of a map 50 showing local traffic conditions. FIG. 3B shows a display 52 showing a selection of music compositions available to the user. Similarly, selection of other main categories shown on the main display may bring up a selection of subcategories.

Figure 4:
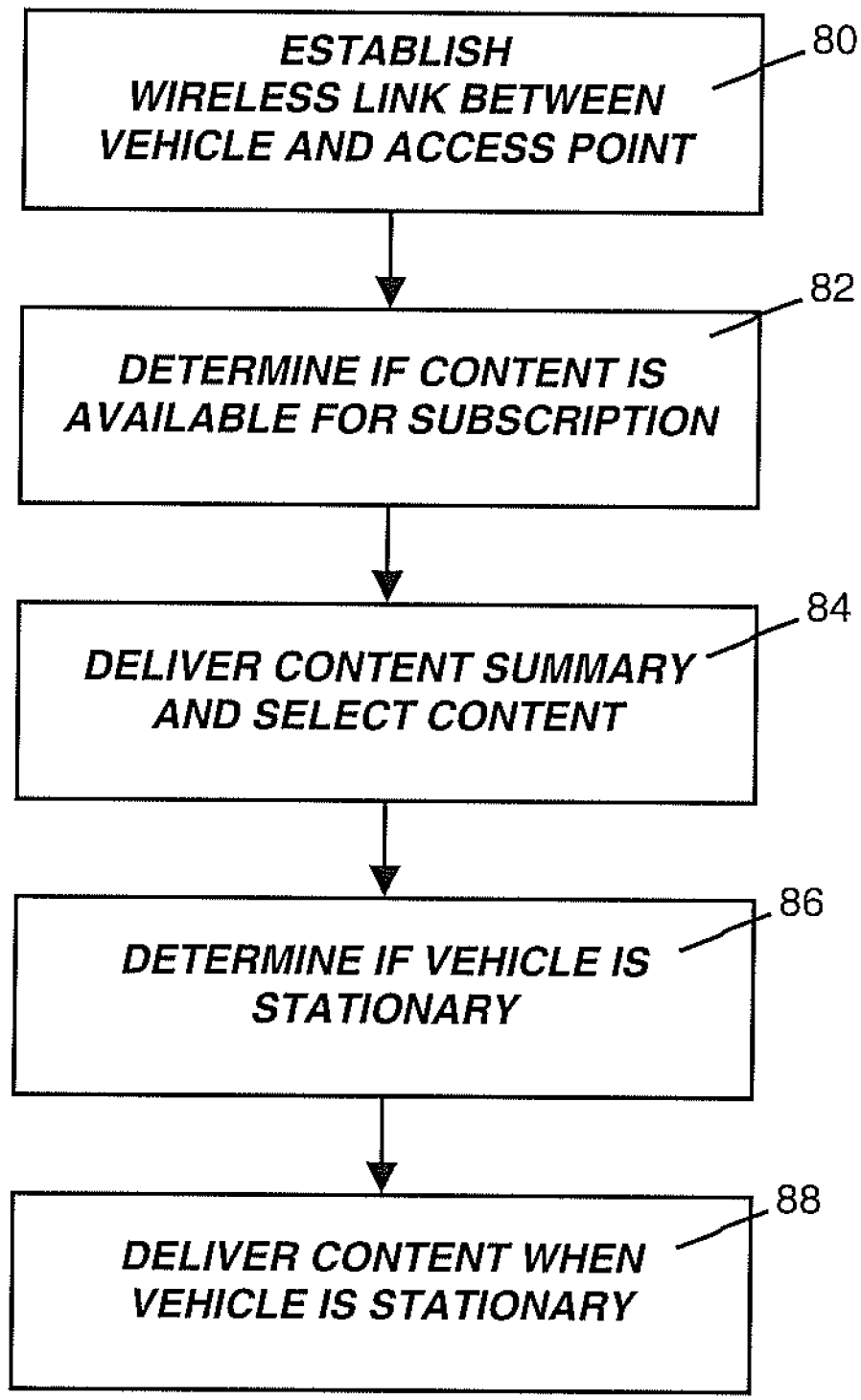
FIG. 4 illustrates an example approach of the present invention, including delivering content to a vehicle at a time when the vehicle is stationary.

FIG. 4 illustrates a method of delivering content to a user, the user being an occupant of a vehicle, the user having a subscription to the content, the method comprising establishing a wireless communications link between a wireless client associated with the vehicle and a wireless access point external to the vehicle (box 80), the wireless access point being in communication with a content supplier; determining if content is available from the content supplier for the user subscription (box 82); delivering a content summary of the content to the user using the wireless communications link between the wireless access point and the wireless client, and selecting content for delivery based on the content summary (box 84); determining whether the vehicle is moving or stationary (box 86); and delivering the content at a time when the vehicle is stationary (box 88).

An example method according to the present invention comprises connecting to the configuration server, checking for available content according to the user subscription information, reviewing available content, and delivering selected content to the user using an in-vehicle entertainment device such as an audio and/or video system. An example method is now described in more detail.

Firstly, the user connects to the configuration server (e.g., via a web interface) and subscribes to content (for example, instructing the content server to download the daily news radio broadcast whenever a new one becomes available). The subscription may be performed using any device in communication with the configuration server, such as a home computer, cell-phone, vehicle system including a wireless client, or other communication device.

Whenever the vehicle is located near a wireless access point, the wireless client within the vehicle connects to the access point (AP), and subsequently to the configuration server, to determine whether new content that matches the user's subscriptions is available.

A system according to the present invention can support both immediate, automatic, postponed, and user-initiated content delivery. If, according to the user's subscription preferences, a content item should be delivered immediately, the content can be automatically delivered to the vehicle system as soon as it becomes available. Alternatively, if a later delivery method is specified, only a short description of the item is delivered to the vehicle, as a summary of further available content. The further content may only be delivered if the user initiates the delivery process, and delivery may be delayed, according to user input or known preferences.

Immediate content delivery is well suited for text and data content that do not consume excessive amounts of traffic and bandwidth, while the postponed delivery method may be used for delivery of bandwidth-intensive content, such as audio and video programs.

The system may also initiate the delivery of content previously marked for downloading by the user, and also resumes any pending content delivery operations (such as any content where earlier delivery was interrupted). The user reviews the available content items and selects content for delivery to the vehicle system. This selection of content may be used for content with postponed delivery, as described above, or other bandwidth-intensive content. The user then chooses available downloaded content using a user input device, such as a touch-screen, and the content is provided to the user using a display, audio, and/or video system within the vehicle. The above example of system operation is exemplary, and other configurations are possible.

Safety-related content, such as accident warnings, weather alerts, emergency information, and the like, may be downloaded and delivered to the user without user intervention. The user may use an input device to modify preferences, for example by choosing not to receive various available content categories, or stop content delivery at desired. Preferences may be modified by user input, permanently or for a shorter period of time. Subscriber preferences may also be modified according to the user previous selection of available content.

Delivery of safety related content may displace non-safety content delivery, particularly if it comprises urgent information. The wireless client may communicate through a direct wireless link with the wireless access point, or in other examples communication may be achieved through a dynamic network including the wireless clients of a plurality of vehicles. The system may also be used for other service applications, such as the advance ordering of products (such as food), hotel rooms, or other items of interest to vehicle occupants. The system may prompt the selection of such items based on, for example, the time of day and location of the vehicle. The system may also provide decision support for the driver, through delivery of safety information such as relative vehicle positions, hazards ahead, warnings to slow down, and the like.

Content may be provided to the user through a pre-installed audio and/or video system within the vehicle. The vehicle system may be configured so that the video system is only viewable by vehicle passengers. In other examples, the video system may allow only safety-related content to be viewed by the vehicle operator.

Content may be transmitted in encoded form to the wireless client associated with the vehicle, and the user subscription information used for decoding the content.

In further examples, a portable electronic device belonging to the user may provide some or all functions of the vehicle system, such as wireless client and/or content storage. A portable electronic device may be a cell-phone, PDA (personal digital assistant), computer, satellite receiver, and the like, or may have some combination of these or other functionalities. For example, the portable electronic device may provide wireless communication for downloading of content, and a user input for subscription or content selection. The portable electronic device may be in communication with a vehicle entertainment system (such as an audio or video system within the vehicle), so as to allow delivery of content through the vehicle entertainment system.

In preferred embodiments of the present invention, the vehicle is an automobile. However, embodiments of the present invention may also be used with other vehicles, such as buses, trains, boats, and the like. For public transport applications, the vehicle system may include a personal entertainment device associated with a passenger. The wireless client may be part of the personal entertainment device, or otherwise located within the vehicle and allowing content transfer to the personal entertainment device. Similarly, a personal entertainment device including the vehicle system components described above in relation to FIG. 1 may be carried by a pedestrian or cyclist.

Patents, patent applications, or publications mentioned in this specification are incorporated herein by reference to the same extent as if each individual document was specifically and individually indicated to be incorporated by reference. In particular, U.S. Provisional Application Ser. No. 60/678,863, filed May 6, 2005, is incorporated herein in by reference in its entirety.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Having described our invention, we claim:

1. A method of delivering content to a user, the user being an occupant of a vehicle, the user having a subscription to the content, the method comprising:

establishing a wireless communications link between a wireless client associated with the vehicle and a wireless access point external to the vehicle, the wireless access point being in communication with a content supplier;

determining if content is available from the content supplier for the user subscription;

delivering continuously a content summary of the content and safety information to the user using the wireless communications link between the wireless access point and the wireless client;

selecting content for delivery based on the content summary;

determining whether the vehicle is moving or stationary; and delivering the selected content at a time when the vehicle is stationary.

2. The method of claim 1, wherein the content comprises audio information.

3. The method of claim 1, wherein the content comprises video information.

4. The method of claim 1, wherein the content comprises safety information.

5. The method of claim 1, wherein determining if content is available from the content supplier is performed by a configuration server external to the vehicle, the configuration server receiving subscription information from the wireless access point, receiving content from the content provider based on the subscription information, and providing the content to the wireless access point for wireless transmission to the wireless client associated with the vehicle.

6. The method of claim 5, wherein the configuration server is in communication with the content provider over a communications network.

7. The method of claim 6, wherein the communications network is the Internet.

8. The method of claim 5, wherein the configuration server receives subscription information from a plurality of users.

\* \* \* \* \*